June 16, 1942.  N. H. GROBER  2,286,727

ALTERNATING CURRENT REGULATING SYSTEM

Filed July 16, 1940

INVENTOR
NATHAN H. GROBER
BY Laurence B. Dodds
ATTORNEY

Patented June 16, 1942

2,286,727

UNITED STATES PATENT OFFICE 2,286,727

ALTERNATING CURRENT REGULATING SYSTEM

Nathan H. Grober, Brooklyn, N. Y.

Application July 16, 1940, Serial No. 345,696

5 Claims. (Cl. 171—119)

This invention relates to alternating current regulating systems and, while it is of general application, it is particularly suitable for use as an electric welding system by means of which the welding current and voltage may be adjusted substantially continuously over wide ranges.

It is frequently desirable that an alternating current welding system be adjustable over a wide range of current or voltage, or both, in accordance with the nature of the weld desired and the type and the gauge of the materials being welded, and that such adjustments be made with a minimum of change in circuit connections or a minimum of adjustment of selecting switches.

Heretofore, there have been proposed numerous alternating current regulating systems for procuring multiple ranges of welding currents and voltages. However, the majority of these prior art regulating systems have required complicated and costly transformers, reactors, and switching mechanisms and have not been entirely satisfactory from a commercial standpoint.

It is an object of the invention to provide a new and improved alternating current regulating system which is inexpensive and simple in operation and by means of which the working current and voltage, for example, the welding current and voltage, may be readily adjusted within wide operating limits.

In accordance with the invention, an alternating current regulating system comprises a supply transformer having a primary winding and a multisection secondary winding system. The system also includes a reactor unit separate from said transformer and having a multisection winding system, said reactor being excited only by the current through its said winding system, and means permanently connecting the sections of one of the winding systems in a single series circuit with all of the sections of the other of the winding systems, at least a portion of the sections of one of said winding systems alternating with certain of the sections of the other. The work circuit or welding circuit includes a pair of terminals and there is provided a single pole switch for connecting to the work circuit terminals any of a plurality of selected portions of the series circuit described including said alternating winding sections, whereby adjustment of said switch is effective to adjust both the impedance and the voltage of said work circuit.

For a better understanding of the present invention, together with other and further objects thereof, reference is had to the following description taken in connection with the accompanying drawing, and its scope will be pointed out in the appended claims.

Figure 1:
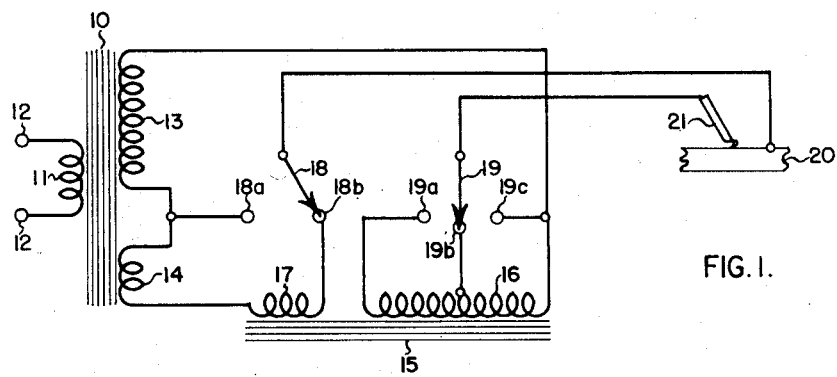
Figure 2:
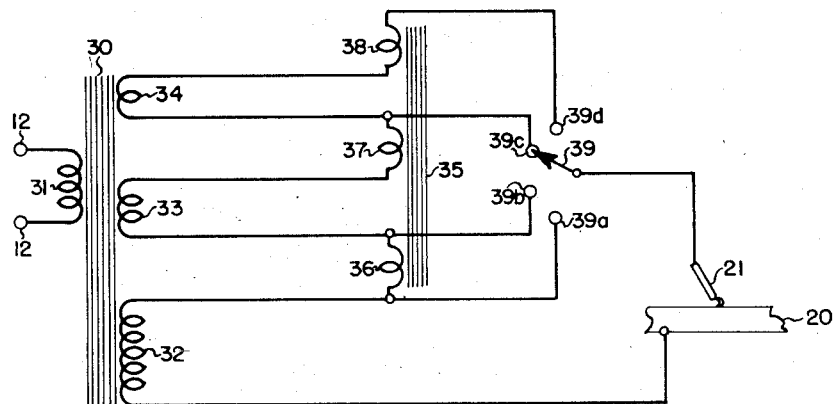
Figure 3:
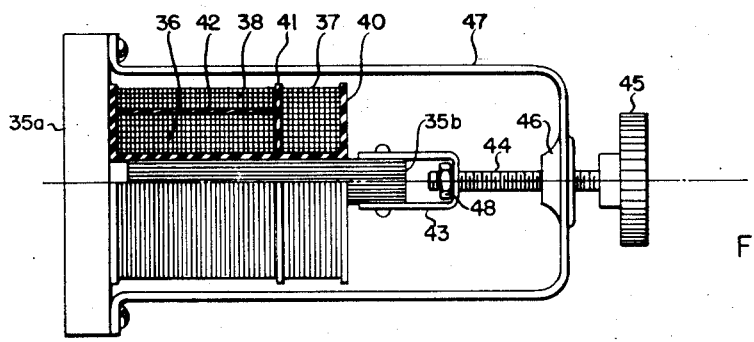

Referring to the drawing, Fig. 1 is a circuit diagram of an alternating current welding system embodying the invention; Fig. 2 is a circuit diagram of a modified alternating current welding system embodying the invention in a preferred form; while Fig. 3 is a view in side elevation, partially sectionalized, of a reactor particularly suitable for use in the regulating system of the invention.

Referring now to the drawing, Fig. 1 is a circuit diagram of an alternating current welding system embodying the invention and comprising a supply transformer 10, preferably of the high leakage reactance type, having a primary winding 11 connected to a pair of input terminals 12 and a secondary winding system comprising a main secondary winding 13 and an auxiliary or booster secondary winding 14. It will be understood that the transformer 10 may comprise separate primary and secondary windings, as illustrated and described, or it may comprise an autotransformer of conventional construction. In order to regulate the welding current in accordance with operating conditions, the system includes an iron core reactor 15 separate from the transformer 10 and having a winding system comprising a main winding 16 and an auxiliary winding 17. The secondary winding system of the transformer 10 and the winding system of the reactor 15 are permanently connected in a single series circuit comprising the reactor winding 16, the transformer windings 13 and 14, and the reactor 17, in the order named. The reactor 15 is self-excited only by the current through its winding system.

In order to select a desired operating voltage and the desired amount of reactance to regulate the welding current, there are provided selector switches 18 and 19, the switch 18 being selectively connectable to contacts 18a and 18b to include or exclude the auxiliary transformer winding 14 and auxiliary reactor winding 17. The switch 19 is provided with contacts 19a, 19b, and 19c connected to taps on the reactor winding 16 in order to adjust the regulating action of the reactor 15 at each operating voltage. The switches 18 and 19 are connected to a work element 20 and a welding electrode 21, respectively, as indicated.

In operation, with the switch 18 connected in the position illustrated, maximum voltage comprising the sum of the voltages of the secondary windings 13 and 14 is applied to the welding circuit. Three ranges of current regulation may be obtained by operation of the switch 19, selectively to include either none, part, or all of the reactor winding 16 in the welding circuit. With the switch operated to the contact 18a, similar steps of welding current regulation may be procured at the lower voltage provided by the transformer winding 13 alone.

A preferred embodiment of the invention is included in the welding system of which Fig. 2 is a circuit diagram. In this embodiment, the supply transformer 30, also preferably of the high leakage reactance type, comprises a primary winding 31 connected to the supply terminals 12 and a secondary winding system comprising a main secondary winding 32 and auxiliary or booster secondary windings 33 and 34. As in the arrangement of Fig. 1, there is provided a current-regulating reactor 35 having a winding system comprising windings 36, 37, and 38. The sections of the transformer winding system and the sections of the reactor winding system are permanently connected in a single series circuit, with the sections of one of the winding systems alternating with those of the other, this series circuit comprising, in the order named, transformer winding 32, reactor winding 36, transformer winding 33, reactor winding 37, transformer winding 34, reactor winding 38. Terminals are brought out at the junctions of the windings 32, 36; 36, 33; 37, 34; and at the two ends of the series circuit. One end of the circuit comprising the lower terminal of the winding 32 is grounded, as indicated, and connected to the work element 20. The other series-circuit terminals are connected to switch contacts 39a, 39b, 39c, and 39d, respectively, of a selector switch 39, the common terminal of which is connected to the welding electrode 21.

While the current-regulating reactor 35 of the system of Fig. 2 may be of any suitable well-known construction, one reactor construction particularly suitable for use in connection with the invention is illustrated in Fig. 3. In this reactor, the winding 36 is disposed on an insulating spool 40 and extends over approximately two-thirds of its length and occupies about one-half of its depth. The winding 37 is disposed over the remainder of the length of the spool 40 and occupies its full depth, being separated from the winding 38 by an insulating disc 41, while the winding 38 is wound over the winding 36, being separated therefrom by an insulating sleeve 42. Disposed transversely of the winding assembly is a magnetic core member 35a, preferably laminated to reduce eddy currents, and the winding assembly may be suitably supported therefrom. The magnetic circuit of the reactor is open but also includes a longitudinal laminated core member 35b disposed approximately at right angles to the core 35a. In order to obtain continuous adjustment of the regulating action of the reactor 35 in each of the positions of the selector switch 39, the core member 35b is made adjustable with respect to the winding system and the core 35a and to this end there is provided a yoke 43, secured to the core 35b, with which co-operates an operating screw 44 having an operating handle 45 and co-operating with a nut 46 secured to a frame 47 attached to the transverse core member 35a, which may serve as a base for the unit. The screw 44 also co-operates with a nut 48 secured to the frame 43 so that operation of the member 45 is effective to adjust the magnetic core member 35b axially with respect to the winding system. It has been found that, with the construction described, a range of inductance variation of the order of 2 : 1, and, therefore, a range of welding current of the order of 2 : 1, may be readily procured.

While the constants of the reactor just described will be proportioned in accordance with the operating requirements of any particular installation, there follows a set of specifications of one design of reactor which has been found particularly satisfactory in the circuit of Fig. 2:

Winding 36 _____ 66 turns No. 8, parallel asbestos covered, wound on 1¾ inch spool; length 3½ inches.

Winding 37 _____ 72 turns No. 7, asbestos covered, wound on same spool as winding 36; length 1⅞ inches.

Winding 38 _____ 120 turns No. 9, asbestos covered, wound over winding 36 but separated by a layer of heavy sheet mica.

Core 35b _____ Sliding core of laminated steel approximately 1⅝ inches square.

In the operation of the welding system of Fig. 2, it will be seen that, as the selector switch 39 is progressively operated from contact 39a to contacts 39b, 39c, and 39d, first, the current regulation is increased by inclusion of the reactor winding 36; secondly, the current-regulating action is still further increased and the operating voltage boosted by inclusion of the transformer winding 33 and the reactor winding 37; and lastly, that the operating voltage is still further boosted and the current-regulating action still further increased by the inclusion of the transformer windings 34 and 38 while, in each of these positions of the selector switch 39, current regulation over a range of approximately 2 : 1 may be procured by adjustment of the reactor core member 35b of Fig. 3.

Thus, it will be seen that there is provided in accordance with this invention an extremely simple alternating current regulating system by means of which the operating voltage and impedance, and thus the current, may be adjusted within wide limits and by means of which such adjustments can be accomplished by operation of only one single-pole switch and the operating member of the reactor, if provided as in Fig. 2. While the invention has been illustrated and described as embodied in a welding system, it will be understood that it is equally suitable for use in other alternating current regulating systems requiring analogous regulation of operating current and voltage, for example, in electric arc furnaces.

While the invention is not limited to any particular range of voltages and currents, there follows a table of operating voltages and currents procured in one embodiment of the invention incorporating a reactor structure of the type shown in Fig. 3 and having the specifications given above:

| Switch position | Operating voltage | Operating current in amperes |
|---|---|---|
| 39a | 65 | 180 |
| 39b | 65 | 75–140 |
| 39c | 75 | 40–90 |
| 39d | 85 | 11–35 |

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. An alternating current regulating system comprising, a supply transformer having a primary winding and a multisection secondary winding system, a reactor unit separate from said transformer and having a multisection winding system, said reactor being excited only by the current through its said winding system, means permanently connecting all the sections of one of said winding systems in a single series circuit with all the sections of the other of said winding systems, at least a portion of the sections of one of said winding systems alternating with certain of the sections of the other, a pair of work circuit terminals, and a single pole switch for connecting to said terminals any of a plurality of selected portions of said series circuit including said alternating winding sections, whereby adjustment of said switch is effective to adjust both the impedance and the voltage of said work circuit.

2. An alternating current regulating system comprising, a supply transformer having a primary winding and a multisection secondary winding system, a reactor unit separate from said transformer and having a multisection winding system, said reactor being excited only by the current through its said winding system, means permanently connecting all the sections of one of said winding systems in a single series circuit with all the sections of the other of said winding systems, all of the sections of one of said winding systems alternating with those of the other, a pair of work circuit terminals, and a single pole switch for connecting to said terminals any of a plurality of selected portions of said series circuit, whereby adjustment of said switch is effective to adjust both the impedance and the voltage of said work circuit.

3. An alternating current regulating system comprising, a supply transformer having a primary winding and a multisection secondary winding system, a reactor unit separate from said transformer and having a multisection winding system, said reactor being excited only by the current through its said winding system, means permanently connecting all the sections of one of said winding systems in a single series circuit with all the sections of the other of said winding systems, at least a portion of the sections of one of the winding systems alternating with certain of the sections of the other, a pair of work circuit terminals, a plurality of terminals connected to certain of the junctions of the elements of said series circuit and to the ends thereof, one of said series-circuit terminals comprising also one of said work circuit terminals, and a single-pole switch for selectively connecting the other of said work circuit terminals to any of the other of said series-circuit terminals, whereby adjustment of said switch is effective to adjust both the impedance and the voltage of said work circuit.

4. An alternating current regulating system comprising, a supply transformer having a primary winding and a multisection secondary winding system, a reactor unit separate from said transformer and comprising a core member and a winding system thereon including a plurality of coaxial winding sections, said reactor being excited only by the current through its said winding system, means permanently connecting all the sections of one of said winding systems in a single series circuit with all the sections of the other of said winding systems, the sections of one of the winding systems alternating with certain of the sections of the other, a pair of work circuit terminals, and a single pole switch for connecting to said terminals any of a plurality of selected portions of said series circuit, whereby adjustment of said switch is effective to adjust both the impedance and the voltage of said work circuit.

5. An alternating current regulating system comprising, a supply transformer having a primary winding and a multisection secondary winding system, a reactor unit separate from said transformer and comprising a multisection winding system, a first core member adjustable axially of said winding system and a stationary second core member disposed adjacent said winding system and at right angles to said adjustable core member, said reactor being excited only by the current through its said winding system, means permanently connecting all the sections of one of said winding systems in a single series circuit with all the sections of the other of said winding systems, the sections of one of the winding systems alternating with those of the other, a pair of work circuit terminals, and a single pole switch for connecting to said terminals any of a plurality of selected portions of said series circuit, whereby adjustment of said switch is effective to adjust both the impedance and the voltage of said work circuit.

NATHAN H. GROBER.